F. A. NADING.
TRACTOR WHEEL.
APPLICATION FILED MAR. 3, 1916.
1,250,486.
Patented Dec. 18, 1917.
2 SHEETS—SHEET 1.
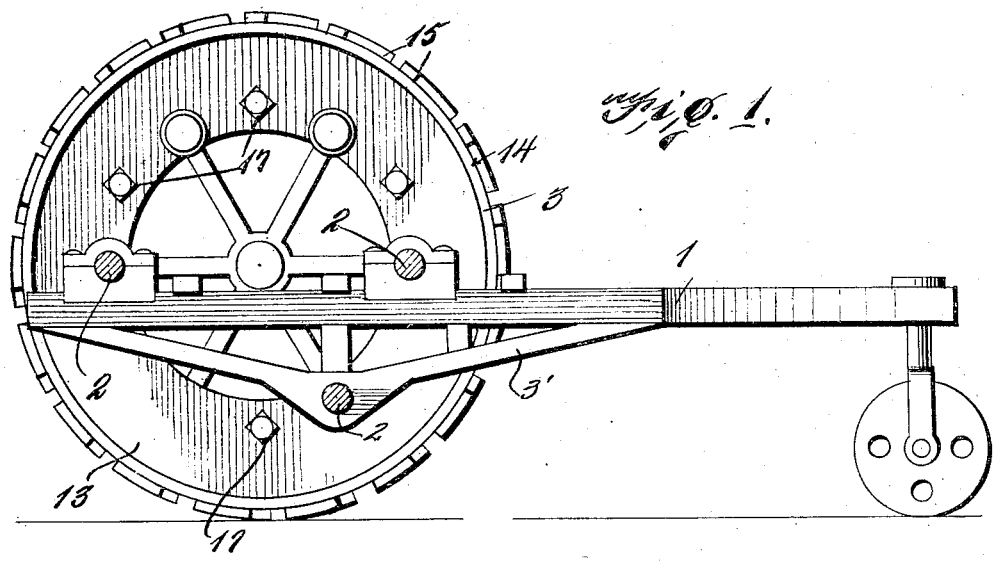
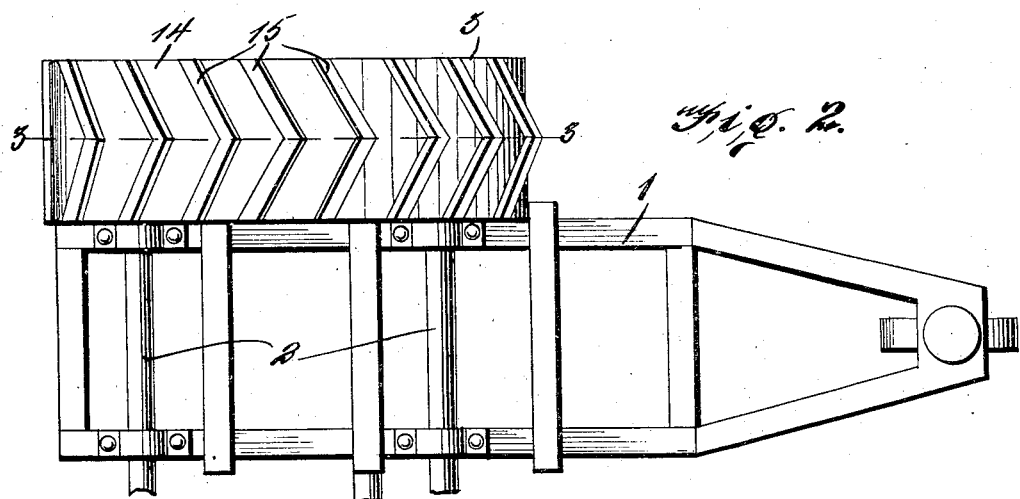
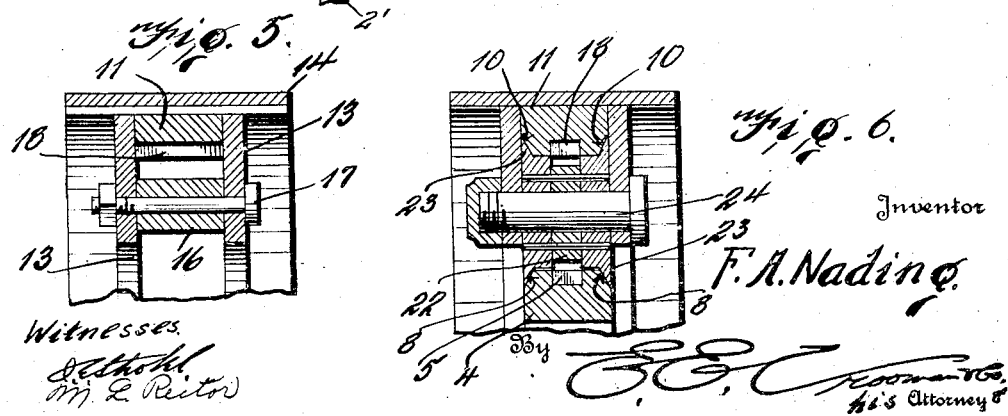

F. A. NADING.
TRACTOR WHEEL.
APPLICATION FILED MAR. 3, 1916.
1,250,486.
Patented Dec. 18, 1917.
2 SHEETS—SHEET 2.
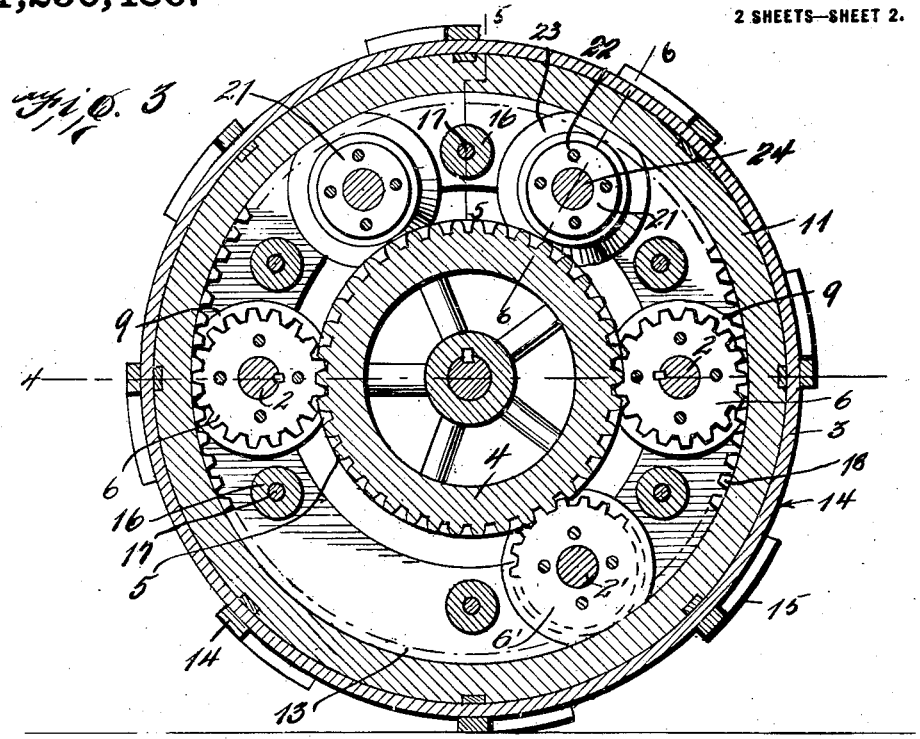
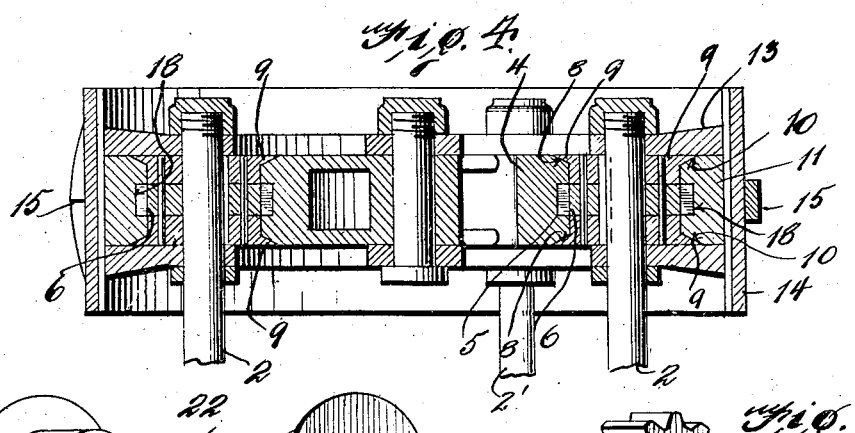
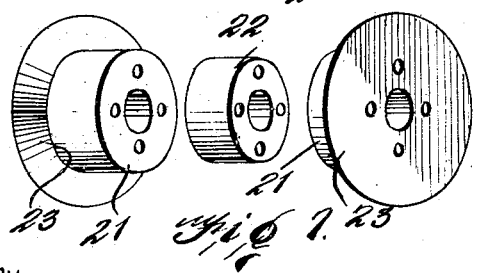
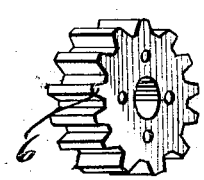
Inventor
F. A. Nading.
Witnesses

UNITED STATES PATENT OFFICE.

FRANKLIN A. NADING, OF KENMARE, NORTH DAKOTA, ASSIGNOR OF ONE-HALF TO OSCAR A. ZUERCHER, OF GLASGOW, MONTANA.

TRACTOR-WHEEL.

1,250,486.

Specification of Letters Patent.

Patented Dec. 18, 1917.

Application filed March 3, 1916. Serial No. 81,961.

*To all whom it may concern:*

Be it known that I, FRANKLIN A. NADING, a citizen of the United States of America, residing at Kenmare, in the county of Ward and State of North Dakota, have invented certain new and useful Improvements in Tractor-Wheels, of which the following is a specification, reference being had therein to the accompanying drawing.

This invention relates to tractor wheels and has for its object the production of a simple and efficient tractor wheel which is driven from a source of power by means of intermediate gears interposed between the felly and hub thereof.

Another object of this invention is the production of a simple and efficient means for imparting movement to a tractor wheel whereby the greatest amount of power may be transmitted from the driving engine or other source of power carried by a truck supported upon the tractor wheel.

With these and other objects in view, this invention consists of certain novel combinations, constructions, and arrangements of parts as will be hereinafter fully described and claimed.

In the accompanying drawings:—

Figure 1 is a side elevation of one of the wheels, a portion of the truck of the tractor being shown in section.

Fig. 2 is a top plan view of the structure shown in Fig. 1.

Fig. 3 is an enlarged section taken on line 3—3 of Fig. 2.

Fig. 4 is a section taken on line 4—4 of Fig. 3.

Fig. 5 is a section taken on line 5—5 of Fig. 3.

Fig. 6 is a section taken on line 6—6 of Fig. 3.

Fig. 7 is a detailed perspective of one of the idle rollers, the several parts being separated for the purpose of illustration.

Fig. 8 is a detailed perspective of one of the pinions adapted to be used for driving the felly of the traction wheel.

Referring to the accompanying drawings by numerals it will be seen that 1 designates the tractor frame, and a pair of driving axles 2 are supported upon the frame and are connected to any suitable source of power for the purpose of rotating the same. A third driving axle 2' is supported upon the frame 1 and is suspended below the frame 1 upon a hanger 3'. A driving pinion 6' is carried by the driving shaft 2' as shown in Fig. 3 and meshes with the gear 4 and the teeth formed in the felly portion 11.

A tractor wheel 3 is carried upon each side of the frame 1 and this tractor wheel 3 comprises an inner gear 4, which is provided with a plurality of gear teeth 5 formed upon the outer periphery thereof. These gear teeth 5 are countersunk within the outer periphery of the hub or gear 4 for the purpose of permitting the pinions 6 to intermesh therewith as illustrated clearly in Figs. 3 and 6 of the drawings. This gear 4 constitutes a bearing for the pinions 6 and 6' hereinafter described. The hub portion 4 is provided with inwardly inclined side faces 8 for constituting trackways for the beveled flanges 9 of the roller portions 10. The roller portion 10 is placed upon either side of the pinions 6 and secured thereto and these roller portions 10 constitute spacing means between the inner hub portion 4 and the outer felly 11.

The driving or transmission axles 2 pass through the roller portions 10 and through the pinions 6 as illustrated in Fig. 6 of the drawings and these shafts 2 also pass through the side plates 13 of the tractor wheel. The side plates 13 are in this way supported upon the driving axles 2 and anchored in engagement with the frame 1. The felly portion 11 is carried by the tread portion 14 of the tractor wheel, the tread portion 14 being provided with a plurality of cleats 15 as illustrated.

These side plates 13 are held in spaced relation by means of the spacing rollers 16, which spacing rollers are supported in engagement with the side plates 13 by means of the bolts 17.

By carefully considering Fig. 6 as well as Fig. 3, it will be seen that the felly portion 11 is provided with countersunk teeth 18 upon the inner face thereof and is also provided with flat shoulder portions 19 for constituting tracks upon which the roller portions 10 are adapted to travel. The side portions 20 of the felly 11 are inclined to conform to the flange portion 9 of the roller portions 10.

It will be seen by carefully considering the drawings, that the construction of the roller portions 10 will hold the pinion 6 against lateral movement upon the felly band 11 owing to the fact that the roller portions 10 are firmly clamped in engagement with the pinion 6.

It should be understood that the pinions 6 are keyed to the shafts 2 which support the same and that three of these driving pinions are employed and are carried by the respective driving shafts 2 and 2' which support the same.

A plurality of idle rollers 21 are interposed between the gear 4 and the felly portion 11 and each of these idle rollers 21 comprises a central bearing portion 22 and a flanged roller portion 23 of similar construction as the flanged roller portions 10, above described.

It should be understood that the roller portions 21 will constitute spacing means between the hub portion 4 and the felly 11.

As above stated, the side plates 13 receive the driving shafts 2 and these plates are held firmly together by means of the stub shafts 24, which stub shafts 24 constitute supporting means for the idle rollers 21 above described.

It should be understood that the tractor wheel is adapted to support or coöperate with a frame and that the shafts 2 and 2' are supported upon a frame as will be understood by carefully considering Figs. 1 and 2 of the drawing. The gear 4 merely constitutes a bearing against which the pinions 6 and 6' bear and against which the rollers 21 work. As stated in the foregoing specification, any suitable source of power may be employed for driving the axle 2 as well as 2', thereby causing the tread of the tractor wheel to rotate for the purpose of driving the tractor. The tread of the tractor is adapted to freely rotate around the side plates 13, which side plates 13 are carried by the shafts 2 and 2'.

What I claim is:—

1. A tractor wheel comprising a rim portion, a felly portion, gear teeth formed upon the inner face of said felly portion, a central gear, a plurality of driving pinions interposed between the central gear and said felly portion, roller portions keyed to said pinions and spaced upon either side of said pinions, said felly portion provided with bevel side edges, said roller portions provided with bevel flanges bearing upon said bevel side portions of said felly portion for producing an efficient bearing upon said felly portion, side plates bearing against the respective ends of said roller portions and engaging the side edges of said felly portions, driving shafts secured to said roller portions and pinions, and spacing means interposed between said side plates.

2. A tractor wheel of the class described comprising a rim portion, a tread carried by said rim portion, a bearing gear, a plurality of pinions interposed between said bearing gear and rim portion, driving shafts keyed to said pinions for imparting rotary movement thereto and facilitating the driving of saim rim portion, bearing portions locked in engagement with said pinions and adapted to overhang the side edges of said rim portion and assist in holding said pinions in mesh with said rim portion, and side plates engaging said roller portions.

In testimony whereof I hereunto affix my signature.

FRANKLIN A. NADING.